Figure 1:
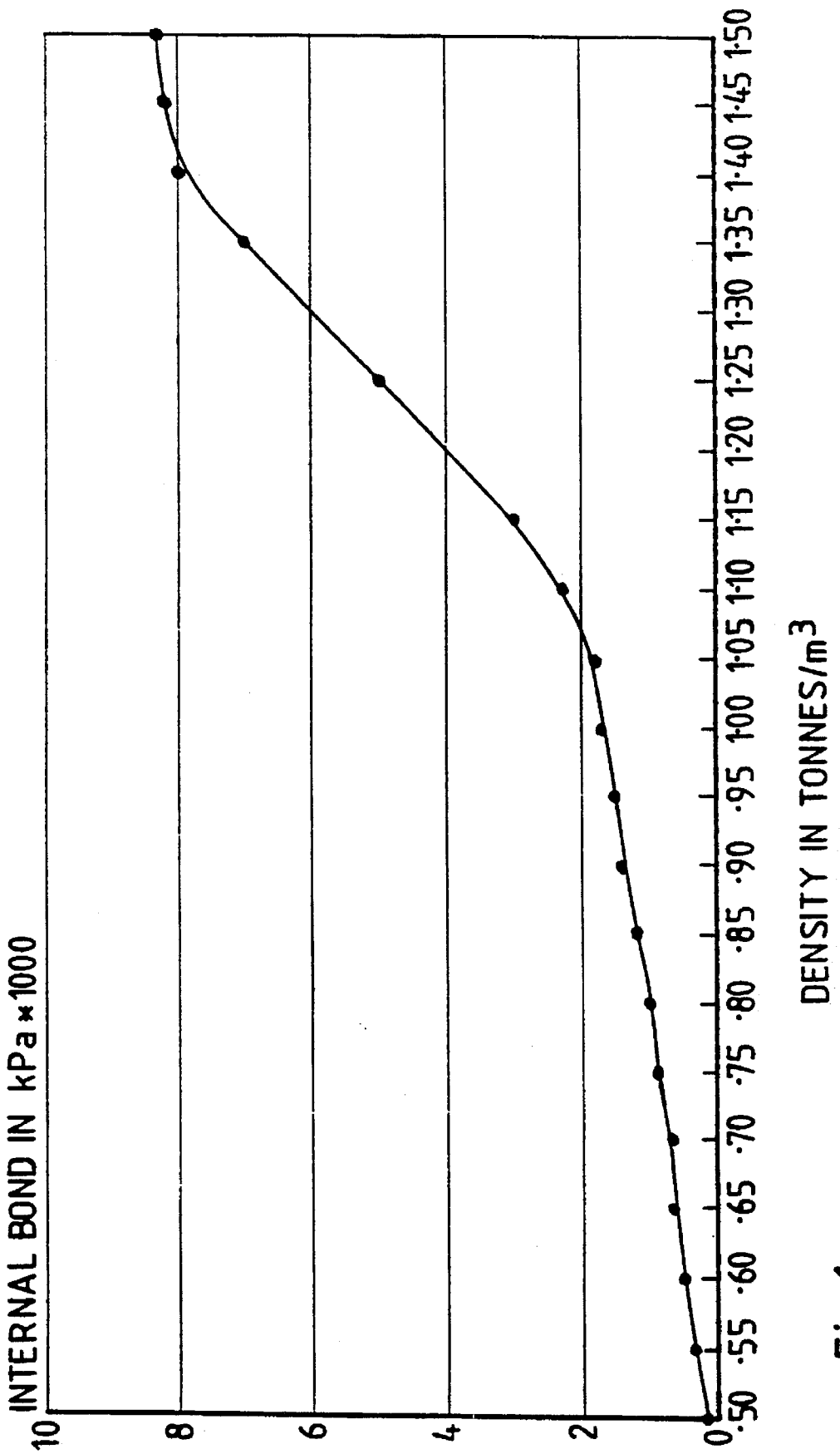

United States Patent [19]

Anthony

[11] Patent Number: 5,558,933

[45] Date of Patent: Sep. 24, 1996

[54] SHEETING MATERIAL AND METHOD OF MANUFACTURING THE SAME

[75] Inventor: Patrick Anthony, Wagga Wagga, Australia

[73] Assignee: ACI International Limited, Australia

[21] Appl. No.: 325,557

[22] Filed: Oct. 18, 1994

Related U.S. Application Data

[63] Continuation of Ser. No. 828,972, filed as PCT/AU90/00309, Jul. 23, 1990, published as WO91/01206, Feb. 7, 1991, abandoned.

[30] Foreign Application Priority Data

Jul. 24, 1989 [AU] Australia ................... PJ5399

[51] Int. Cl.⁶ ............... B32B 3/00; D04H 1/08; B27N 3/04
[52] U.S. Cl. ............ 428/290; 428/281; 428/284; 428/286; 428/289; 428/298; 428/299; 428/300; 428/301; 428/302; 428/325; 428/326; 428/327; 428/406; 428/407
[58] Field of Search ................. 428/281, 284, 428/286, 290, 325, 326, 327, 406, 407, 288, 289, 299, 300, 301, 302

[56] References Cited

U.S. PATENT DOCUMENTS 3,779,843  12/1973  H. J. Knapp .
4,283,450  8/1981   Luck et al. ................ 428/171
4,503,115  3/1985   Hemels et al. .

FOREIGN PATENT DOCUMENTS

| 213708 | 11/1956 | Australia . |
| 213495 | 6/1957 | Australia . |
| 239231 | 7/1960 | Australia . |
| 262586 | 6/1963 | Australia . |
| 42675/64 | 10/1965 | Australia . |
| 37825/68 | 11/1969 | Australia . |
| 133970 | 8/1976 | Denmark ............ B29J 5/02 |
| 2495/64 | 7/1968 | Finland ............. B29J 5/00 |
| 375722 | 4/1975 | Sweden ............. B29J 5/00 |
| 1197965 | 7/1970 | United Kingdom . |

Primary Examiner—Patrick J. Ryan
Assistant Examiner—Richard Weisberger
Attorney, Agent, or Firm—Merchant, Gould, Smith, Edell, Welter & Schmidt, P. A.

[57]  ABSTRACT

Sheeting in the form of fibre board comprising cellulose fibres and a thermosetting resin in an amount sufficient to bond the cellulose fibres together when compressed the sheeting having a density of 1100 kg/m³ or greater. The method of manufacturing the sheeting comprises the steps of combining the cellulose fibres and thermosetting resin together and forming a mat or web, and thereafter heating and compressing the mat or web to a density of at least 1100 kg/m³.

11 Claims, 2 Drawing Sheets

SHEETING MATERIAL AND METHOD OF MANUFACTURING THE SAME

This is a continuation of application Ser. No. 07/828,972, filed as PCT/AU90/00309, Jul. 23, 1990, published as WO91/01206, Feb. 7, 1991, now abandoned.

This invention relates to an improved sheeting material and method of manufacturing the same.

One type of sheeting material currently known is formed from a blend of wood fibre and resin material which is compressed to form a sheet. An example of such sheeting, is sold under the Trade Mark Laminex Craftwood. This sheeting finds application in the manufacture of furniture and wall paneling such as for cupboards and the like. Typical sheeting of this type has resin content in the order of 7% to 9% by weight and a density of 700 kg/m$^3$. The major disadvantage of sheeting of this type is that it has relatively low strength and is prone to degradation such as swelling or other deformation as a result of exposure to moisture.

Another type of sheeting currently in use is formed from a series of paper plies with resin material interposed or mixed therewith and thereafter compressed to form a sheet. This sheeting is far stronger than the wood fibre sheeting described above, and is also not as susceptible to degradation as a result of exposure to moisture. An example of such sheeting is sold under the Trade Mark Laminex Solid Grade. The major disadvantage of this sheeting is its relatively high cost to manufacture.

It is an object in accordance with one aspect of the present invention to provide an improved sheeting which is relatively cheap to manufacture but has relatively high strength and is resistant to degradation as a result of exposure to moisture. It is also an object in accordance with another aspect of the present invention to provide a method of manufacturing sheeting.

According to one aspect of the present invention there is provided sheeting comprising cellulose fibres and a thermosetting resin in an amount sufficient to bond the cellulose fibres together when compressed characterized in that the sheeting has a density of 1100kg/m$^3$ or greater.

According to another aspect of the present invention there is provided a method of manufacturing sheeting comprising the steps of combining cellulose fibres and a thermosetting resin together and forming a mat or web, and heating and compressing the mat or web to a density of at least 1100 kg/m$^3$.

Desirably the cellulose fibres and thermosetting resin are compressed beyond a point where the gradient of a line measuring the internal bond strength of the sheeting on the abscissa against the density of the sheeting on the mantissa changes, the gradient of the line being steeper beyond the aforementioned point.

It has been surprisingly found that the properties of sheeting comprising cellulose fibre and resin can be markedly improved by increasing the density of the sheet formed beyond a particular level which, to some extent, is dependent upon the amount of resin used. The reason for the unexpected improvement in properties of the sheet is not understood. It can be speculated that as the composition is compressed the voids between the fibre and resin become increasingly small. It is these voids which allow ingress of water which cause the degradation of the currently known fibre board of the type referred to earlier in damp conditions. As the voids become increasingly smaller the water, molecules find it increasingly difficult to permeate the board. This increase in difficulty has been found to be approximately linear with increase in density. However, at a certain stage of compression some of the voids become too small to allow the water molecules to pass. At this stage these small voids are effectively acting as a filter to prevent ingress of water. It is believed that further increase in density beyond this point decreases permeability at a higher rate as the proportion of voids below the critical size increases until all voids are below the critical size and the properties of the sheeting reach a plateau based on the nature of the resin/fibre composition being used.

It has been found by experimentation that the point of inflection of the internal bond/density curve is approximately reached when the swelling in water of the sheet is less than 1%. The test for swelling in water is conducted in accordance with British Standard BS 5669 the duration of immersion being 24 hours. Whilst not wishing to be bound by this theory, it is believed that this water absorbency level is the point when a significant number of the voids in the composition have been squeezed to a size less than the critical size to allow permeation of water molecules.

The critical point is reached at different densities depending upon the proportions and nature of the resin used in the fibre/resin mixture. At high proportions of resin, say 25% resin, the point is reached at a density of 1100kg/m$^3$ or less and at very low proportions of resin, say 5% the point is reached at very high densities of 1600kg/m$^3$ or more.

The cost of resin is an order of magnitude greater than the cost of fibre and hence there is an optimum proportion of resin to fibre based on the balance between extra costs of resin and the extra material cost and processing cost of producing the same volume of a higher density board.

The temperature required during the process is dependent on the resin being used and suitable temperatures are well known to those skilled in the art.

The thermosetting resin may be present in an amount such that when the sheeting is subjected to a water absorption test in accordance with British Standard BS 5664, the immersion time for the test being 24 hours, the water absorption of the sheeting is less than 1%. In certain preferred compositions according to the present invention the thermosetting resonance is present in an amount of at least 10% by weight.

The thermosetting resin may be present in an amount of at least 15% by weight and desirably in an amount in the range of 15% to 25% by weight. A particularly suitable amount is about 16% by weight. The percentage of resin or resin loading referred to is calculated on a dry solids basis. That is 16% resin by weight means 16% by weight of resin to dry fibre weight. The sheeting in its final form may also contain water in an amount in the range of 4% to 11% by weight.

To achieve the required density of the sheet material according to the present invention, it is subject to a pressure of up to 1800psi and preferably, about 1500 psi. The pressure used is not particularly critical. It has been found that normally a pressure of at least 1500 psi is required to obtain a density of 1100 kg/m$^3$. Normally available commercial presses are unable to be used above 2000 psi. The exact pressure to be used to obtain a sheet of the required density and water swell may be found for any particular composition of fibre and resin by simple experiment.

The nature of the cellulose fibre used is not narrowly critical. Suitable fibre may be vegetable fibre such as for example bagasse. The cellulose fibres may be in the form of wood fibres and while many types of wood fibre may be suitable pinus radiata have been found particularly useful.

Any resin suitable for use in forming sheeting from fibrous material may be used. Advantageously, resins of the amino resin type are used and it is desirable that the resins include a phenolic component such as phenol, tannin or recorcinol. Such resins which are suitable for use in the sheeting of the invention include Melamine Urea Phenol Formaldehyde (MUPF), Melamine Phenol Formaldehyde (MPF), Melamine Urea Formaldehyde (MUF), Tannin Formaldehyde (TF), Phenol Urea Formaldehyde (PUF) and Recorcinol Urea Formaldehyde (RUF). It has been found that an amount of resin included in the material in the region of about 16% by weight is particularly advantageous.

The press may be heated and the combination of heat and pressure cures the resin so as to thereby produce the sheeting.

Figure 2:
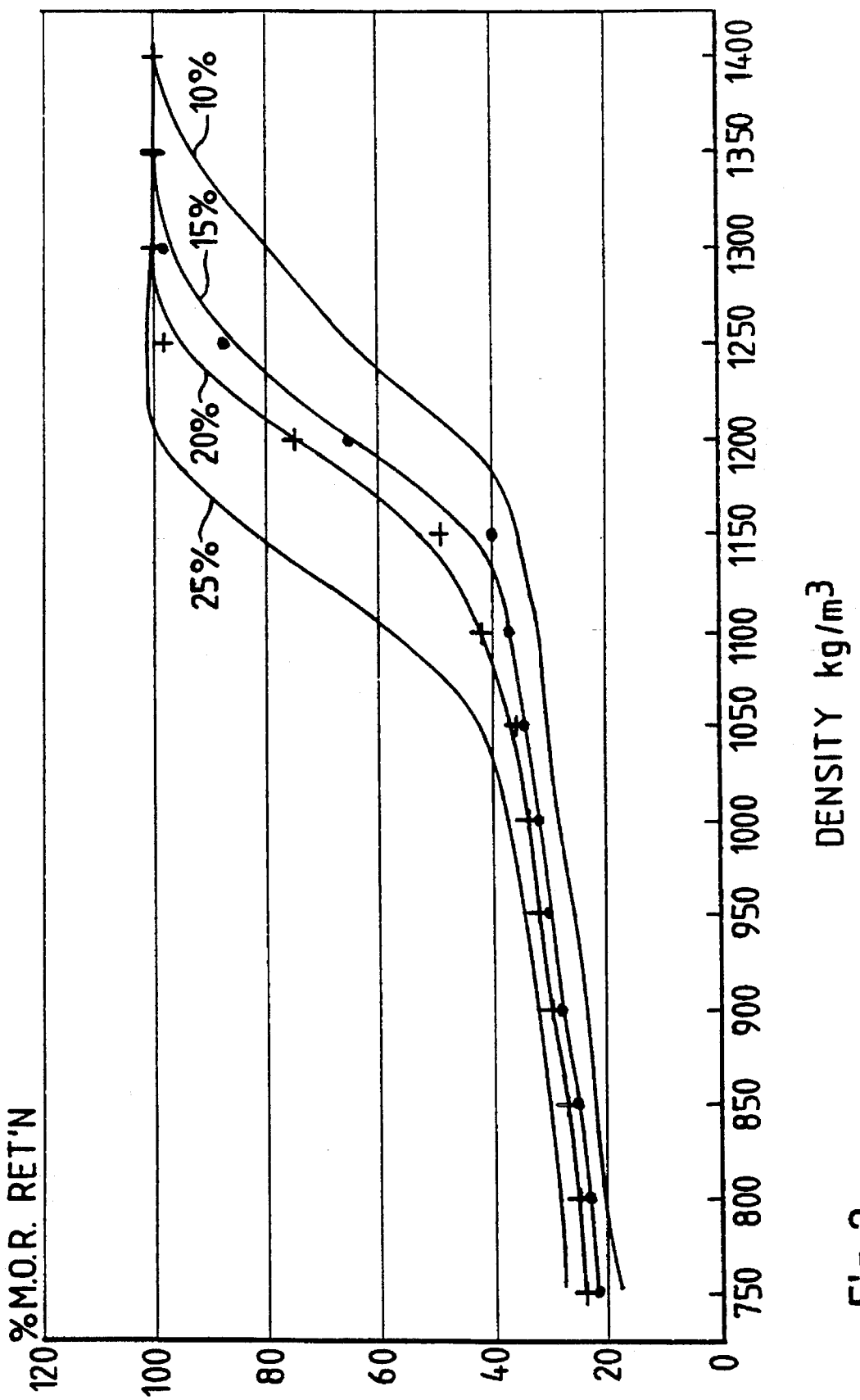

To assist in understanding the present invention reference is made to the attached drawings in which:

FIG. 1 is a graph plotting the internal bond strength of sheeting against the density for sheeting containing the same amount of resin; and FIG. 2 is a graph plotting the percentage modulus of rupture retention against density of sheeting after 72 hours boiling.

The two graphs shown in FIGS. 1 and 2 resulted from trials conducted to test sheeting compressed to various densities.

In FIG. 1, a series of sheets were produced of different densities but with the same amount of resin. The fibrous material was in the form of pinus radiata wood fibre and the resin was an amino resin with a phenolic component. The fibre and resin was formed into a mat with a moisture content of between 8% to 15% before compressing. The mat was compressed in a pressure at a suitable temperature to form a 16 mm board using sufficient amount of material to achieve the desired density. The graph represents the line of best fit resulting from the trials conducted.

As can be seen, the internal bond for the various sheets increases generally linearly as the density increases up to a value of about 1100 kg/m$^3$. At densities about this critical level, however, the rate of increase in internal bond strength increases markedly.

In FIG. 2 four lines are shown, being typical plots for sheets containing between 10% to 25% resin by weight. In this case, the percentage modulus of rupture retention after 24 hours boiling is the characteristic being plotted. This test was done in accordance with Australian Standard AS 1859. Again the graph shows a change in rate of improvement in the property in the region of density of around 1100 kg/m$^3$.

The sheeting is most advantageously formed in a process line and an example of such line is set out below.

Logs of timber from which the wood fibre is to be produced are first debarked and then passed through a chipper which reduces the timber into small chips. After chipping, chips may be transferred to a chip pile prior to being washed to remove any grit and other waste material which would damage machinery used in subsequent processing steps. The clean chips may be conveyed to a steamed digester unit where the chips are heated by steam in order to soften or plasticise them. This process allows easier break down of the chips into fibre as well as providing improved fibre quality. The chips enter the defibrator which rubs the wood apart into fibres.

The newly formed fibre may be conveyed to dryer units and at this stage, the wet fibres may be sprayed with resin. after drying, the fibres may be placed in a dry fibre storage bin before being conveyed to a forming machine. The forming machine may be adapted to lay the fibre into a mat of random orientation by way of vacuum system drawing that fibres is down onto a mesh belt. The mat is preferably laid continuously and passes from the forming machine at a selected height.

A precompressor may be used to reduce the thickness the mat prior to entering the press. Preferably the mat is trimmed to pressing with and cut to board length by a flying cut off saw. The mat may pass through a density cage which checks for profile consistency. A metal detector may be provided to scan the mat for foreign bodies.

The mat may pass into a loading cage before entering a press which produce the sheeting according to the invention and which in a preferred form is heated by oil so that the combination of heat and pressure cures the resin and produces the sheeting.

If desired, the sheeting so formed can have laminated paper or other, secured to the external surface thereof.

It has been found that the sheeting material of the present invention exhibits properties for superior to standard sheeting formed from wood fibre and resin and that the properties are comparable to those of sheeting material formed from paper plus and resin.

Finally, it is to be understood that various alterations, modifications and/or additions may be incorporated into the various constructions and arrangements of parts without departing from the spirit and ambit of the invention.

I claim:

1. A building substrate consisting essentially of cellulose fibres and a cured thermosetting resin present in an amount of at least 10% by weight of resin to dry fibre weight wherein the said cellulose fibres and resin are bonded together and the substrate has a moisture content after compression of 4 to 11% by weight of moisture to dry fibre weight and a density of 1100kg/m$^3$ or greater and wherein the thermosetting resin is present in an amount such that when the substrate is subjected to a water swell test in accordance with British Standard BS5669, the immersion time for the test being 24 hours, the water swelling of the substrate is less than 1.0%.

2. A building substrate according to claim 1 wherein the moisture content of the said substrate is 7 to 11%.

3. A building substrate according to claim 2 wherein the said thermosetting resin is present in an amount of at least 15% by weight of resin to dry fibre weight.

4. A building substrate according to claim 2 wherein the thermosetting resin is present in an amount of 15 to 25% by weight of resin to dry fibre weight.

5. A building substrate according to claim 1 wherein said thermosetting resin is present in an amount of 15 to 25% by weight of resin to dry fibre weight.

6. A building substrate according to claim 1 wherein said thermosetting resin is present in an amount of about 16% by weight of resin to dry fibre weight.

7. A building substrate according to claim 1 wherein the density of the substrate is 1100 to 1300kg/m$^3$.

8. A building substrate according to claim 1 wherein said thermosetting resin in an amino resin with a phenolic component.

9. A building substrate according to claim 8 wherein said thermosetting resin is selected from the group consisting essentially of: melamine urea phenol formaldehyde; melamine phenol formaldehyde; melamine urea formaldehyde; tannin formaldehyde; phenol urea formaldehyde; resorcinol urea formaldehyde; and mixtures thereof.

10. A building substrate according to claim 1 wherein the cellulose fibre is wood fibre.

11. A building substrate according to claim 9 wherein the thermosetting resin comprises melamine urea phenol formaldehyde.

* * * * *